June 23, 1942.  C. R. ERICKSON  2,287,345
OPTICAL PROJECTION DEVICE
Filed April 2, 1940  3 Sheets-Sheet 3
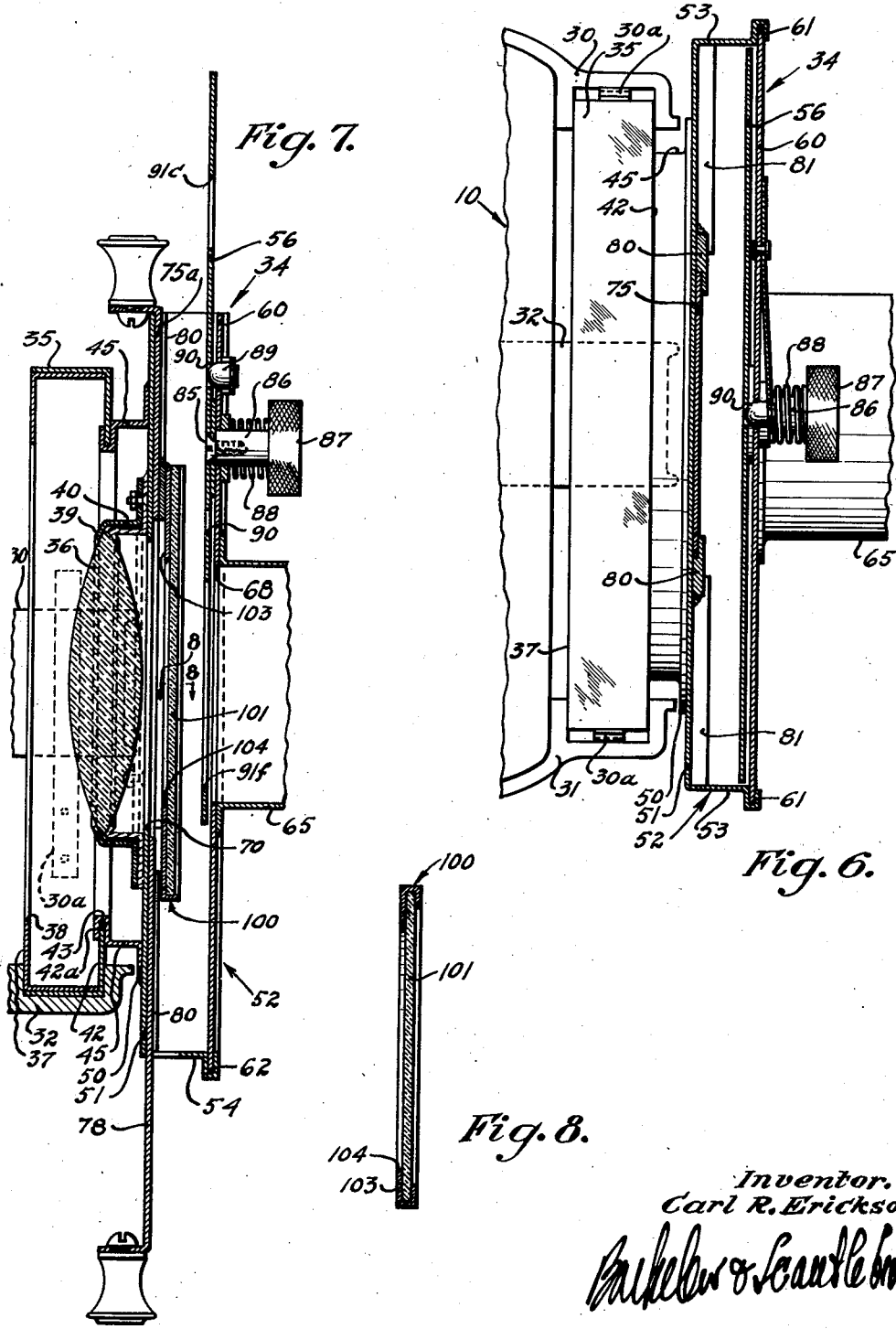
Inventor.
Carl R. Erickson.
Attorneys.

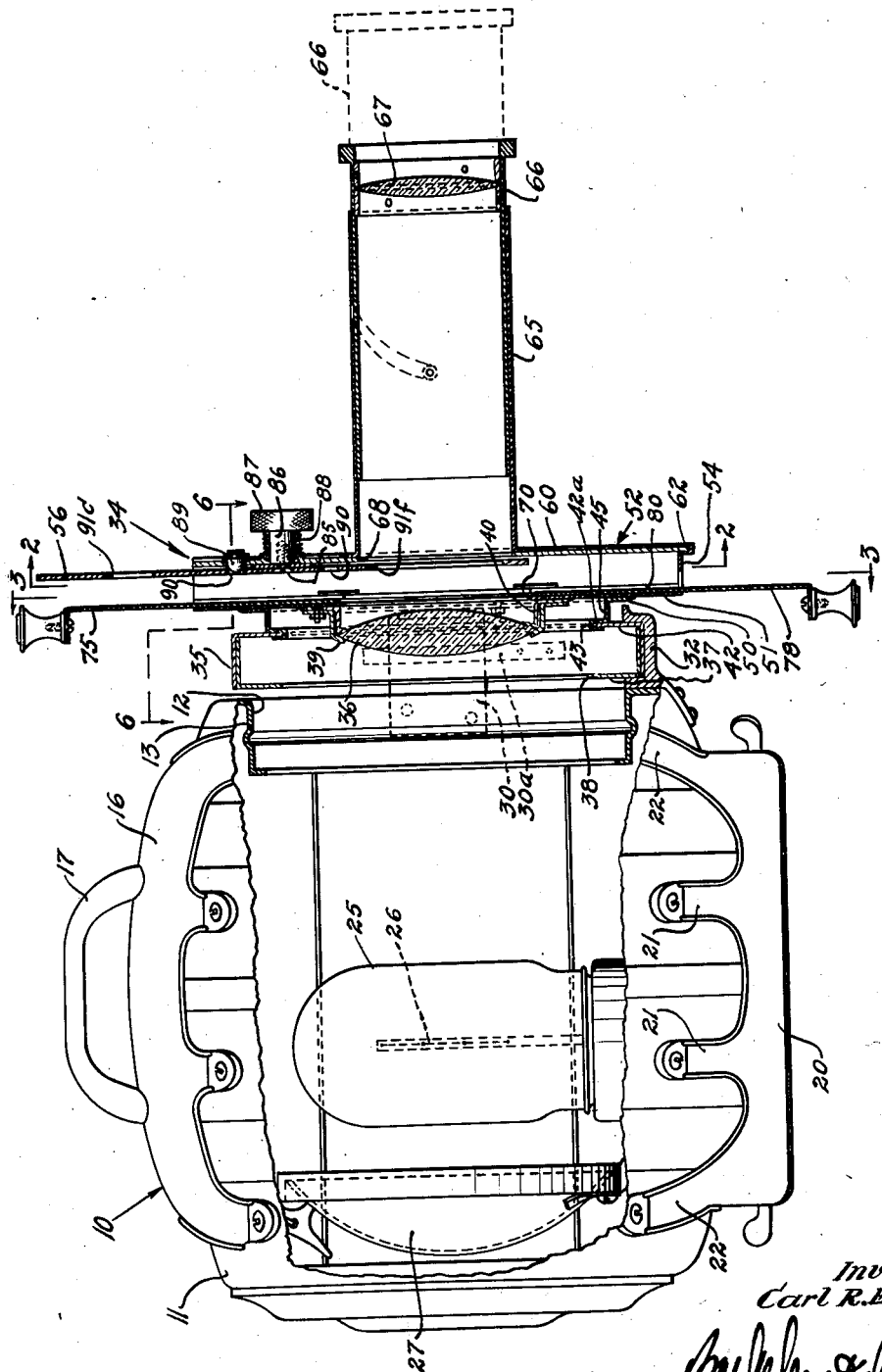

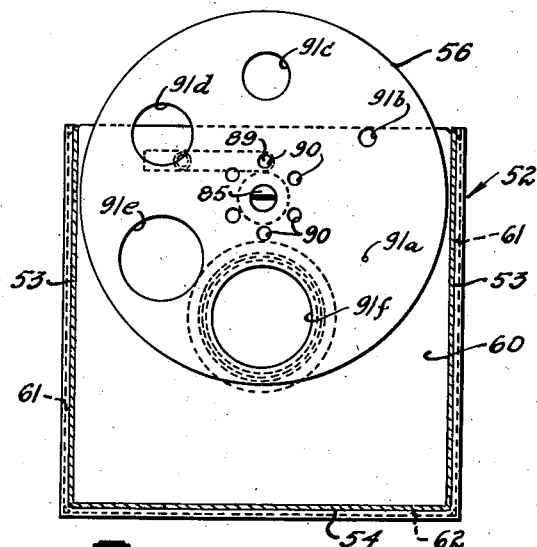
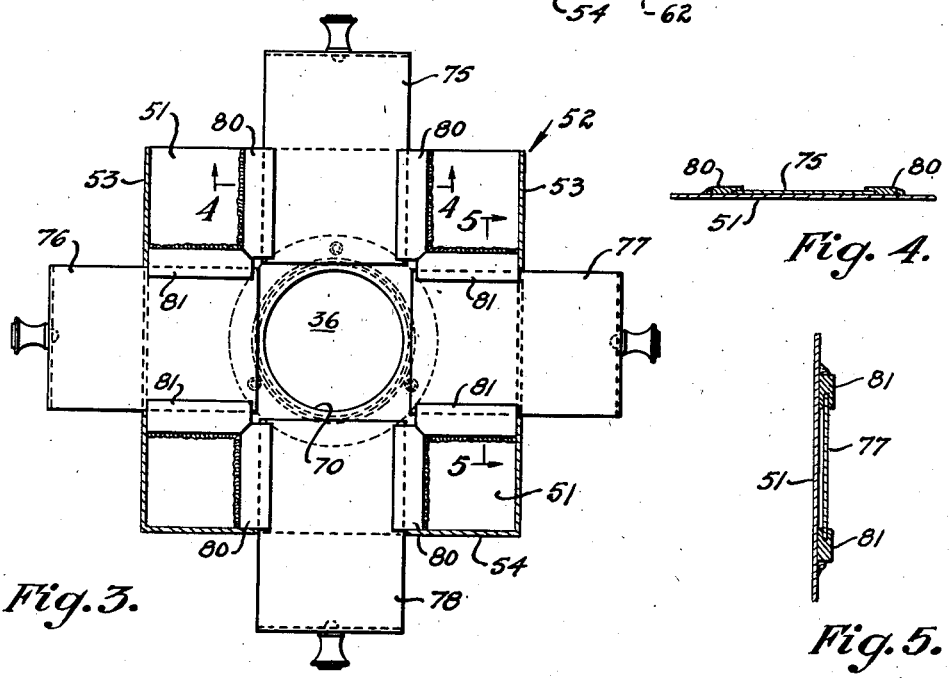

Patented June 23, 1942

2,287,345

UNITED STATES PATENT OFFICE 2,287,345

OPTICAL PROJECTION DEVICE

Carl R. Erickson, Los Angeles, Calif., assignor to Bardwell & McAlister, Inc., Los Angeles, Calif., a corporation of California Application April 2, 1940, Serial No. 327,401

1 Claim. (Cl. 240—3)

This invention relates generally to optical projection systems, and more particularly to systems and devices for projecting sharply defined spots of light of various sizes and shapes.

A general object of the invention is to provide an improved studio type lamp adapted to the purpose of projecting a uniform, intense and sharply defined light spot of any desired outline, such as round, rectangular, key-hole, or any other desired shape, against the background of a scene being photographed, or to high-light the subject or a portion of the subject being photographed.

A further object of the invention is to provide, as an attachment for a conventional type of studio spot lamp, a device designed to convert such a spot lamp into an optical projection system for projecting an intense, sharply defined light spot of any desired shape.

A type of spot lamp now in wide use in studio photography comprises an incandescent light source and Fresnel projection lens. This type of lamp is conventionally employed to increase the illumination of a localized area in ordinary studio light practice, but is not suitable for the purpose contemplated by the present invention, since the outline of the spot which it projects is not sharply defined, and cannot be brought down to sufficiently small size. In accordance with the present invention, such a lamp is provided with an attachment device comprising a condenser lens, an aperture forwardly of said lens, and a projection lens mounted ahead of the aperture. The Fresnel lens of the lamp is removed. The back lens of the attachment device illuminates the aperture while forming an image of the light source at the rearward nodal point of the projection lens, and the projection lens projects an image of the intensely illuminated aperture against a scene, background or subject. The aperture is defined by adjustable aperture means, and in a preferred form of the invention, this aperture means embodies four sliding mats, which are adjustable to give rectangular apertures of different dimensions, and the aperture means is rotatable about the axis of the optical system to permit the projected rectangle of light to be tilted to any desired angle. The aperture means embodies also a series of circular apertures formed in a revolving disk, which may be employed in place of the previously mentioned mats to provide circular spots of different diameters. The device is also equipped with a background slide on which original designs may be drawn or painted on glass and projected onto the background.

With this preliminary discussion, the invention will be best understood by now referring to the following detailed description of a present preferred embodiment thereof, reference for this purpose being had to the accompanying drawings, in which:

Fig. 1 shows, in side elevation with parts broken away, a conventional type of studio spot lamp equipped with an attachment device for converting it into an optical projection system in accordance with the present invention, the attachment device itself being shown in longitudinal vertical section;

Fig. 2 is a cross section taken on line 2—2 of Fig. 1;

Fig. 3 is a cross section taken on line 3—3 of Fig. 1;

Fig. 4 is a detailed section taken on line 4—4 of Fig. 3;

Fig. 5 is a detail section taken on line 5—5 of Fig. 3;

Fig. 6 is a view taken as indicated by line 6—6 of Fig. 1;

Fig. 7 is a view similar to a portion of Fig. 1, but showing the use of a glass slide; and Fig. 8 is a detail cross section on line 8—8 of Fig. 7.

In the drawings numeral 10 designates generally a conventional type of studio spot lamp, that here shown being the lamp disclosed in Patent No. 2,177,639 to Carl R. Erickson, though it will of course be understood that any other suitable spot lamp may be employed in connection with the present invention; it is also to be understood, of course, that the present invention is not necessarily made up as an attachment device for a conventional studio spot lamp, but may, on the contrary, be embodied as a projection system complete in itself.

The specific spot lamp here shown for illustrative purposes has a substantially cylindrical or barrel shaped exterior casing 11, provided with a forward opening 12 defined by an inwardly turned flange 13. This inwardly turned flange 13 ordinarily carries the Fresnel lens of the lamp 10, though for the instant purpose, said lens is removed and therefore does not appear in the drawings. Secured to the top of the casing is a casting 16 provided with a handle 17, while a focussing mechanism housing 20 is mounted on the lower side of the casing, and has arms 21 and 22 engaging and secured to the side walls of the casing.

The light source is shown in the form of an incandescent lamp 25, having filament 26, and back of lamp 25 is a small spherical reflector 27, adapted to receive light rays from lamp 25 and reflect them to a focus in the plane of the filament of the lamp, in a conventional manner. It will be understood that the light source and reflector may be mounted within casing 11 in any suitable manner, being ordinarily movable together in a forward and rearward direction for focusing purposes. Any suitable mounting and focusing arrangement for so moving the light source and reflector may be provided; that disclosed in the aforesaid patent is appropriate and preferred. The details of the focusing arrangements are not pertinent to the present invention and are therefore not illustrated herein.

The front end of the casing 11 of lamp 10 is provided with three forwardly projecting brackets 30, 31 and 32 adapted to receive and support the attachment device 34, the bracket 32 being at the bottom of the lens opening and the brackets 30 and 31 being at the two sides thereof.

Attachment device 34 has a rearward, rectangular casing portion 35 affording a housing for collector lens 36. Rectangular casing 35 is received between the brackets 30 and 31, and is supported at the bottom by bracket 32, being provided at the sides with bow springs 30a adapted to frictionally engage brackets 30 and 31 and thereby yieldingly support the device against accidental displacement from its operative position seated on bracket 32. The rearward side 37 of casing 35 has a circular aperture 38 for passage of light from light source 25 to lens 36, lens 36 being held in position by lens holding rings 39 and 40 extending from a later described supporting wall. The forward wall 42 of rectangular casing 35 has a circular aperture 43 which receives the rearward end of a forwardly projecting tubular member 45, the latter being formed with an annular channel confining the inner edge 42a of wall 42, in the manner clearly illustrated in Fig. 1. The engagement of edge 42a in said channel is such as enables tubular projection 45 to be rotated easily within wall 42, thereby enabling rotative adjustment of the parts mounted on said tubular projection, as will be more fully described hereinafter.

The forward end of tubular projection 45 has an outwardly turned flange 50, to which is secured a wall 51 that forms the rearward side of an aperture housing 52. Wall 51 is turned forwardly at the sides and bottom to form the sides 53 and bottom 54 of this housing 52, the upper side of the housing remaining open to accommodate a circular aperture plate 56. The forward side of housing 52 is closed by a forward wall or plate 60 slidably received within ways 61 formed at the forward edges of housing sides 53, the lower edge of plate or wall 60 seating in a channel 62 formed at the forward edge of bottom wall 54. Wall or plate 60 is thus insertible in the device from the top.

Projecting forwardly from wall 60 is a tubular lens holder 65, in which is slidably mounted a lens tube 66 containing the projection lens 67, lens tube 66 being understood to be slidable forwardly and rearwardly within tube 65 for focusing purposes. Plate 60 is formed with an aperture 68 in line with tubular lens holder 65.

The lens holding rings 39 and 40 are mounted on the rearward side of casing wall 51, as illustrated. Between wall 51 and lens carrying plate or wall 60 is positioned the aperture means of the system, as now to be described. Wall 51 is formed with a large circular aperture 70, of nearly or substantially the diameter of lens 36. A four-way mat device enables a rectangular aperture of any size, shape or position to be readily provided. The four mats, designated at 75, 76, 77 and 78 (see Figs. 1 and 3) are slidable inwardly and outwardly in ways just forwardly of wall 51. The upper and lower mats 75 and 78 are slidable immediately adjacent the forward surface of wall 51, their edges being received within ways provided by guide strips 80 (see Fig. 4), while the two horizontally movable mats 76 and 77 are slidable immediately forwardly of mats 75 and 78 in ways provided by guide strips 81 secured to wall 51 (see Fig. 5). It will be understood that these slides or mats 75 and 78 may be positioned to provide a rectangular aperture of any size or position. The angular position of the rectangular aperture is of course adjustable by rotation of the housing 52 with relation to the rectangular portion 35 of the device, which latter remains stationarily mounted with reference to the lamp.

The aforementioned circular aperture plate 56 is rotatably mounted on plate 60, between said plate 60 and wall 51. As shown in Figs. 2—6—7, aperture plate 56 is secured, preferably by means of a screw 85, to a flanged stud 86 rotatably mounted in plate 60 and provided, forwardly of plate 60, with an operating knob 87. A coil compression spring 88 interposed between knob 87 and the forward side of plate 60, serves to draw the aperture plate against plate 60, the flange portion of stud 86 bearing against the inside surface of wall 60. A spring pressed detent 89 engages with positioning apertures 90 in aperture plate 56 to position said aperture plate accurately in selected positions of rotation. This aperture plate is provided with a series of circular or other shaped apertures, such as 91a to 91f (Fig. 2), adapted to be successively positioned in alinement with the optical axis of the system as the aperture plate is rotated. These apertures 91a etc., may of course be of different shapes or of different sizes, as desired; in the present instance the aperture plate is shown as provided with a series of circular apertures of different sizes. The previously described capability for ready removal of plate 60 from the device, and the ready demountability of aperture plate 56 from mounting plate 60 when the latter has been so removed from the device (accomplished by removal of screw 85), permits the aperture plate 56 to be easily and quickly interchanged with others having apertures of different sizes or shapes.

Figs. 7 and 8 illustrate the use of a glass slide, on which may be painted any form or shape of aperture desired. The upper mat 75 of Fig. 1 is in this instance removed and replaced by a slide 75a, which may be like mat 75 except for being considerably shorter, being receivable in the same slide ways in which the mat 75 is normally mounted. Mounted on this slide 75a is a rectangular frame 100 for a glass slide 101, the frame 100 being spaced from slide 75a by an intervening plate 102, so as to clear the guide strips 89. The rear wall 103 of frame 100 has a large circular aperture 104 concentric with the optical axis of the system. It will be understood that an aperture or design of any size or shape may be depicted on glass 101, being preferably painted thereon with black or any opaque paint.

By use of the described rotatable aperture plate, sliding mats, or glass slide, an aperture or other design of any desired size or shape is provided between condenser lens 36 and projection lens 67. Light from source 25 is collected by lens 36 and brought to a focus at a point substantially at projection lens 67, or preferably at its rear nodal point. This results in intense lighting of the aperture formed by the aperture plate 56, or by the four-way mats, or depicted on the glass slide, as the case may be, and an image of the aperture is projected by lens 67 onto the scene, background or subject to be photographed. The projected image is of uniform illumination as well as being very sharply defined. Such a sharply defined light spot is frequently desirable in photgraphy, being useful for high lighting of the subject, as well as in such applications as projection of a silhouette against a light back-drop. For example, assuming such a light spot to be projected against a light background screen or drop, the studio being darkened except for the spot, the "action" or subject to be photographed may be interposed between the projector and the screen, and the resulting silhouette on the screen may be photographed by a camera which is so positioned that it will not include the action itself within its field of view. The camera will thus photograph a silhouette of the action in a brilliantly lighted spot, surrounded by a completely black field. The optical projection system of the present invention of course has many additional uses and applications, those here instanced being simply illustrative of a few of its practical applications.

It will be understood that the drawings and description are merely illustrative of and not restrictive on the broader claims appended hereto, since various changes in design, structure and arrangement may be made without departing from the spirit and scope of the invention or of the appended claim.

I claim:

An optical projection attachment for a spot lamp having a lamp casing and a light source in said casing, comprising: a supporting frame demountably attachable to the forward end of said lamp casing, said supporting frame having a forward wall disposed at right angles to the lens axis and formed with a large round aperture, a forwardly projecting tubular member rotatably mounted at its rearward end in said aperture, a frame mounted on the forward end of said tubular member and comprising spaced parallel forward and rearward walls at right angles to the lens axis and connecting wall portions, a condenser lens mounted to the rear of said rearward wall, sliding aperture defining mats mounted between said forward and rearward walls, a projection lens tube mounted on the forward side of said forward wall, and an aperture plate received between said forward and rearward walls and rotatably mounted on said forward wall.

CARL R. ERICKSON.